United States Patent [19]

Meyer et al.

[11] Patent Number: 5,138,486
[45] Date of Patent: Aug. 11, 1992

[54] INVERTED MICROSCOPE WITH INTEGRATED RAY PATHS

[75] Inventors: Manfred Meyer, Heidenheim; Walter Geis, Aalen, both of Fed. Rep. of Germany

[73] Assignee: Carl-Zeiss-Stiftung, Fed. Rep. of Germany

[21] Appl. No.: 614,706

[22] Filed: Nov. 16, 1990

[30] Foreign Application Priority Data

Nov. 18, 1989 [DE] Fed. Rep. of Germany ....... 3938412
Nov. 18, 1989 [DE] Fed. Rep. of Germany ....... 3938413

[51] Int. Cl.⁵ .......................... G02B 21/20; G02B 2/18; G02B 21/36
[52] U.S. Cl. ................................. 359/363; 359/372; 359/375; 359/503; 359/833
[58] Field of Search ............... 350/502, 511, 514, 574, 350/287, 512, 513, 515, 516, 517, 526, 528

[56] References Cited

U.S. PATENT DOCUMENTS

| | | | |
|---|---|---|---|
| 1,470,770 | 10/1923 | Sidentopf | 350/173 |
| 2,303,906 | 12/1942 | Benford et al. | 350/502 |
| 2,518,252 | 8/1950 | Reardon et al. | 350/508 |
| 3,405,989 | 10/1968 | Mentink | 350/511 |
| 3,437,395 | 4/1969 | Rosenberger et al. | 350/508 |
| 3,574,295 | 6/1968 | Tasaki | 350/502 |
| 4,210,384 | 7/1980 | Meyer et al. | |
| 4,440,475 | 4/1984 | Colliaux | |
| 4,685,776 | 8/1987 | Inoue et al. | |
| 4,770,520 | 9/1988 | Hoogesteger | |

FOREIGN PATENT DOCUMENTS

| | | | |
|---|---|---|---|
| 204321 | 11/1983 | Fed. Rep. of Germany | 350/514 |
| 3432635 | 4/1985 | Fed. Rep. of Germany | |
| 3744156 | 7/1989 | Fed. Rep. of Germany | |
| 2528989 | 12/1983 | France | |
| 1392446 | 4/1975 | United Kingdom | 350/514 |

OTHER PUBLICATIONS

"Nikon Epiphot", brochure by Nippon Kogaku K.K., 8419-01 KEC 304-15/1 (2618), Japan.

Primary Examiner—Jon W. Henry
Attorney, Agent, or Firm—Eugene Stephens & Associates

[57] ABSTRACT

The invention is an inverted microscope with a housing having multiple integrated ray paths leading from the specimen being examined to (a) the viewer/operator and (b) one or more auxiliary ports used for image recording and/or measurement by accessories such as cameras and video recorders. The microscope lens is positioned below the specimen stage; and, positioned below the lens is a simple reflector which deflects the combined rays from the lens diagonally upward toward the viewer at exactly the same angle at which the viewer looks into the microscope's binocular eyepieces. The position of this simple reflector is the lowest point in the unit's paths of rays, thereby significantly lowering the lens turret and, therefore, the specimen stage to a relatively low, ergonomically-appropriate position. The optical arrangement is simple and compact, minimizing the number of deflections in the path of the viewing rays. Further, light from the microscope lens is deflected along the second path to the auxiliary port and the recording camera by an optical element which is positioned above the reflector in the diagonally-upward path of rays, thereby providing ample room at the auxiliary port to permit use of a recording camera having an automatic-rewind housing. The invention also includes removable and interchangeable tubes which include viewing binoculars and/or an additional auxiliary image port positioned along a vertical path of rays and/or a further additional auxiliary image port positioned along a horizontal path of rays.

10 Claims, 4 Drawing Sheets ically-appropriate height above the bottom of the housing.

INVERTED MICROSCOPE WITH INTEGRATED RAY PATHS

TECHNICAL FIELD

This invention relates to inverted microscopes for viewing objects and for recording and/or measuring their images.

BACKGROUND

In conventional inverted microscopes, such as those disclosed in U.S. Pat. Nos. 4,210,384 (Meyer et al.) and 4,685,776 (Inoue et al.), the light rays passing through the microscope lens are directed perpendicularly downward from the specimen and then deflected from this downward path along at least one of two horizontal ray paths, a first one of these ray paths being again deflected upwardly in the direction of the viewer, while the second of these paths continues horizontally to an auxiliary image port used for the recording of the image by a camera or video recorder.

This conventional organization of the ray paths requires that the microscope's specimen stage be positioned relatively high because a large amount of space is required beneath the microscope's lens for beam-splitting prisms, some of which are adjustable. Also, the second ray path to the camera port must be positioned at a certain minimum height above the bottom of the microscope housing in order to permit the use of a recording camera with an automatic-winder housing. Since the second ray path to the auxiliary camera port is positioned below the first ray path to the viewer, and since both of these ray paths are positioned below the lens, both the lens turret and the specimen stage must be positioned quite high on the microscope's housing. This prior art arrangement is ergonomically unsatisfactory, because it does not permit the operator to manipulate the specimen with his or her arms supported.

U.S. Pat. No. 4,685,776 has positioned the plane of the ray path to the camera port above the ray path to the viewer. However, this requires that the two ray paths intersect a second time, thus resulting in design restrictions. Further, this just-described prior art arrangement deflects the light path from the specimen to the viewer up to five times, making the apparatus relatively complex and reducing image quality.

In a company brochure entitled "Nikon Epiphot", Nippon Kogaku KK discloses an inverted microscope with integrated light ray paths in which the path for the viewing rays is deflected by a single reflection, from the downwardly directed combined light path from the microscope's lens, diagonally upward to the viewer. This diagonally-upward path of the viewing rays is identical to the angle at which the operator looks into the eyepieces of the microscope.

However, this Nikon arrangement still requires a relatively high stage area because, as is true of the other two conventional arrangements discussed above, the second path to the auxiliary port is positioned below the prism which splits the combined rays from the microscope's lens into the viewing and auxiliary paths. Further, it is often considered desirable to provide additional auxiliary image ports for recording or measuring equipment larger and/or heavier than a simple camera, such additional image ports usually being arranged with a vertical optical axis so that the weight of the auxiliary equipment can be directly supported by the microscope housing. However, with the just-described Nikon arrangement, it is complex to deflect light from the diagonally-upward path of viewing rays to any such additional image ports, particularly if it is also desired to releasably attach the additional port and/or the viewer's binocular tube to the microscope housing by means of one or more interchangeable tubes.

Our invention is a novel arrangement for an inverted microscope with a simple and compact construction which minimizes the number of deflections in the path of the viewing rays, provides ample room at the auxiliary port to permit use of a recording camera having an automatic-rewind housing, and still locates the specimen stage at a relatively low, ergonomically-appropriate position.

Further, the invention provides additional auxiliary ports arranged in relatively simple interchangeable tubes which can be releasably attached to the housing by means which are not subject to sensitive manufacturing tolerances.

SUMMARY OF THE INVENTION

In the novel arrangement disclosed herein, a simple reflector is positioned below the microscope's lens and deflects the combined rays from the microscope's lens diagonally upward toward the viewer at exactly the same angle in which the viewer looks into the microscope's binocular eyepieces. The position of this simple reflector is the lowest point in the unit's paths of rays, thereby significantly lowering the position of the lens turret and the specimen stage.

Light from the microscope's lens is deflected along the second path to the auxiliary image port and the recording camera by an optical element which is positioned (in terms of light ray travel) behind the reflector, i.e., this optical element lies in the diagonally-upward path of rays deflected by the simple reflector referred to above. Therefore, the auxiliary ray path to the camera lies in a plane high enough above the base of the microscope to provide ample room for a recording camera with an auto-wind housing.

In the preferred embodiment, the optical element which deflects rays along the auxiliary ray path is a beam-splitting prism through which light travelling in the direction of the viewer passes in a straight line. Therefore, viewing rays are only deflected once, by the reflector referred to above, prior to reaching the microscope's binoculars.

Preferably, the diagonally-upward path of rays extends at an angle of 45° relative to the vertical. This angle is particularly advantageous ergonomically, since it permits the specimen stage to be viewed without requiring lateral movement of the operator's head.

The beam-splitting prism is located relatively close to one of the microscope's intermediate image planes; and since this prism is usually movable, it can be mechanically coupled with a reticle, and/or a focusing aid, and/or other similar means for facilitating measurement and documentation of the specimen being examined.

In the preferred embodiment, the deflection of light to the auxiliary image port for the camera is achieved by particularly compact apparatus. Namely, the portion of light being directed along the second path to the camera is reflected twice within the beam-splitting prism. Since the light entering the prism is travelling at 45° to the vertical, by making the prism with glass having an index of refraction of at least 1.55, the second reflection within the prism is directed, by total internal reflection, at an angle of 45° with the incident surface of the prism. Therefore, even where the total angle of the path of rays due to aperture is up to 9°, all of the light being reflected by the prism to the second ray path is totally internally reflected and leaves the prism travelling along the desired horizontal path toward the auxiliary camera port.

As indicated above, it is often desirable to have inverted microscopes include additional auxiliary image ports for accessories such as measuring devices and video cameras. The invention provides a third ray path to such a further auxiliary image port by means of a second beam-splitting prism which, similar to the first prism described above, is positioned in the diagonally upward path of the viewing rays. Again, the viewing rays pass directly through the prism, while the deflected rays are reflected twice within the prism. However, the third ray path is vertical. The image output port for this third ray path is at the top of the microscope unit and, therefore, is particularly suitable for heavy accessories which can be supported in a mechanically stable manner by the microscope housing itself.

In terms of the direction of light travelling from the lens to the viewer and/or to the additional image port, this third ray path is arranged behind the tube lens. In this manner, only one tube lens is required to create an intermediate image in both the binocular eyepiece tube and in the auxiliary image port. Further, the tube lens, the binocular tube, and the additional auxiliary port are all arranged in an interchangeable tube which can be releasably attached to the microscope housing.

For a less expensive version of the apparatus, the invention provides a second interchangeable tube which includes only the binocular tube without any additional auxiliary port. However, also provided is a more elaborate interchangeable tube which not only includes the vertical auxiliary port and the binocular tube, but still another auxiliary port arranged on a horizontal path. In each of these arrangements, respective individual tube lenses are incorporated in each respective interchangeable tube so that the desired image positions for each unit can be easily preadjusted and so that the means used for interconnecting each respective unit with the housing are not subject to sensitive manufacturing tolerances.

DRAWINGS

DETAILED DESCRIPTION OF THE PREFERRED EMBODIMENT

Figure 1:
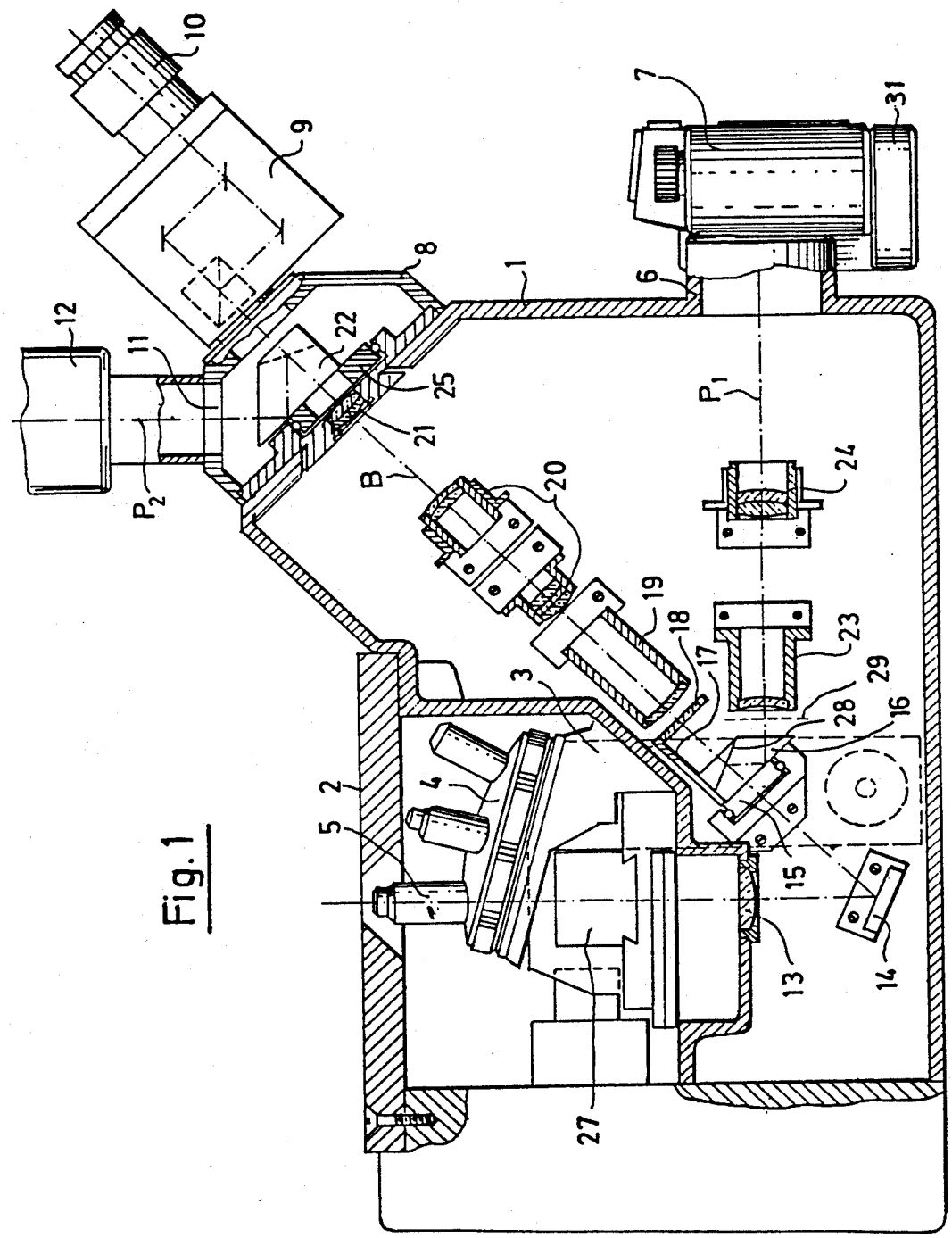
FIG. 1 is a vertical sectional view of an inverted microscope according to the invention, showing the optical and mechanical construction of the apparatus.

The microscope shown in FIG. 1 has a closed, essentially U-shaped housing. A specimen stage 2 is mounted to the housing so that it connects the two upright extensions of the "U". Mounted within the opening between the upright extension is a vertically movable support 3 carrying a lens turret 4. In FIG. 1, one lens 5 is shown in operative position (only the housing of lens 5 is shown).

A vertical path of rays extends vertically downward from the specimen stage through lens 5, an incident light reflector slide 27 (not shown in detail), and a tube lens 13. Lens 13, together with the respective lenses in turret 4 which each have a back focus corrected to infinity, produces a first intermediate image at the location of a reticle 18 which will be described later.

Tube lens 13 is followed directly by a reflector 14 which deflects the path of rays at an angle of approximately 45° diagonally upward toward the viewer. Arranged in this upwardly-directed path of rays B, between reflector 14 and the intermediate image plane, is a beam-splitting prism 16 which separates a second path of rays $P_1$ extending to an auxiliary image output port 6 and a camera 7 on the front side of the apparatus. Second path $P_1$, after being reflected at a splitter surface 28 of prism 16, is again deflected at the light-entry surface of the prism 16 (by total internal reflection) to travel in a horizontal direction. An intermediate image 29 is projected in the image plane of camera 7 by means of field lens 23 and a subsequent imaging lens 24.

Beam-splitting prism 16 is located in upwardly-extending path B at a sufficient distance from reflector 14 to assure that there is enough clearance below ray path $P_1$ so that an automatic-winder housing 31 may be attached to camera 7.

Prism 16 is mounted on a sliding element 15 which can be set in several positions. While prism 16 splits the beam received from reflector 14 at a ratio of 50:50 between ray path B and ray path $P_1$, in one of the adjustable positions of slide 15, beam-splitting prism 16 is replaced by a correspondingly thick plate of glass which allows all of the light to pass along path B to the viewer. Additional adjustment positions of sliding element 15 may be provided with (a) other beam-splitting prisms having different dividing ratios and/or (b) a reflector which reflects all the light along path $P_1$.

The base surface of prism 16 is not reflective and, in fact, acts as the light-entry surface for rays travelling upward from reflector 14. Therefore, the light reflected by partially reflecting surface 28 of prism 16 will only be reflected again by the base of prism 16 so long as it impinges internally on the base at an angle greater than the prism's critical angle for internal reflection. Since the ray paths encompass rays up to limits determined by the microscope's aperture angles, selection of a prism material having an index of refraction of at least 1.55 can assure that rays received at aperture angles up to 9° will be totally internally reflected when impinging on the base of prism 16 following the reflection from its splitter surface 28. In one actual construction of the invention, BAK4 glass was selected for prism 16, with the resultant critical angle of total reflection being 39.6°. This permitted the above-described 45° double reflection of rays, from viewing path B to auxiliary camera path $P_1$, to encompass rays from a full aperture opening as large as 10°.

Figure 2:
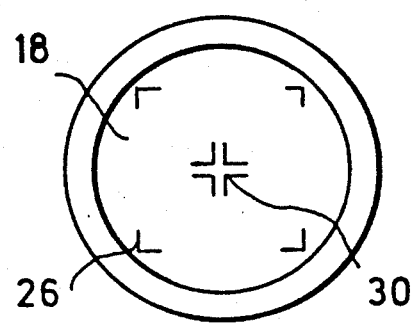
FIG. 2 shows the reticle of FIG. 1 in plan view on an enlarged scale.

Reticle 18 is also mounted to sliding element 15 by means of a bracket 17. Reticle 18 is located in the intermediate image plane in the path of viewing rays created by the tube lens 13. Furthermore, as can be seen in FIG. 2, reticle 18 also supports a focusing aid 30 which can be used to assure that the object plane is projected in focus in the film plane of camera 7. Reticle 18 is movably coupled with prism 16 by bracket 17 and, therefore, is selectively positionable in ray path B as needed by the operator to facilitate measuring and image-recording operations.

In terms of the direction of light travel, following reticle 18 are a field lens 19 and another lens 20, which create a telecentric path of rays.

A removable/interchangeable tube 8 is attached to the upper inclined facing end of the housing 1 of the microscope. Interchangeable tube 8, which is adapted to the housing 1 by means of mating dovetail elements, supports the binocular tube 9 of the microscope and, in addition, has another auxiliary port 11 for accessories such as a television camera 12 which is partially visible in FIG. 1. A third path of rays $P_2$ leads to port 11 after being reflected out of the path of viewing rays $P_1$ into the vertical. To accomplish this, another beam-splitting prism 22 is provided in tube 8 behind a second tube lens 21 which generates the intermediate image in the eyepiece 10 of the eyepiece tube. Again, the viewing rays pass through prism 22 in a straight line, while the path of light rays leading to the camera 12 is twice reflected, once by the splitter surface and once by the base surface of the prism. Prism 22 has the same configuration as prism 16 and is similarly mounted to a sliding element 25 to permit selective positioning of prism 22 into or out of the path of rays leading to binocular tube 9.

Figure 3:
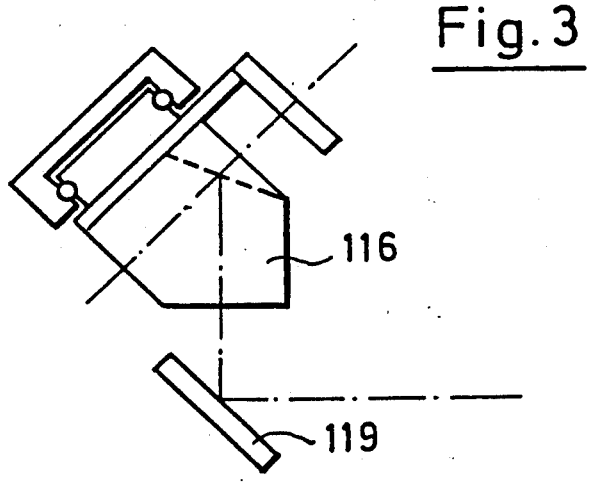
FIG. 3 is a schematic diagram representing an alternate form for a beam splitter of FIG. 1.

For directing light along the auxiliary paths $P_1$ and $P_2$, it is not absolutely necessary that the respective ray paths be twice reflected within special prisms such as those described above. Instead, prisms 16 and 22 may be replaced by a simple beam-splitting prism 116 (FIG. 3), and the second deflection of the rays (along either horizontal path $P_1$ or vertical path $P_2$) may be accomplished by a separate mirror 119.

The alternative prism/mirror combination just described above may be preferable in those designs where sufficient space is available in the apparatus at the intersections between the diagonally-upward path of rays and the paths to the auxiliary ports. When prisms such as prism 116 are used, their only function is beam splitting. Therefore, the material used for the prism is no longer restricted to glass having a higher index of refraction, and prism thickness can be selected to assure sufficient separation of the reflected rays from the light travelling along the diagonally-upward path.

Figure 4:
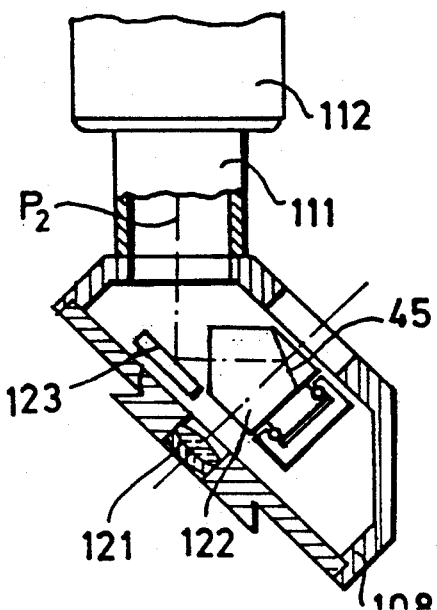
FIG. 4 is a sectional view of a first alternative embodiment for the interchangeable tube of FIG. 1.
Figure 5:
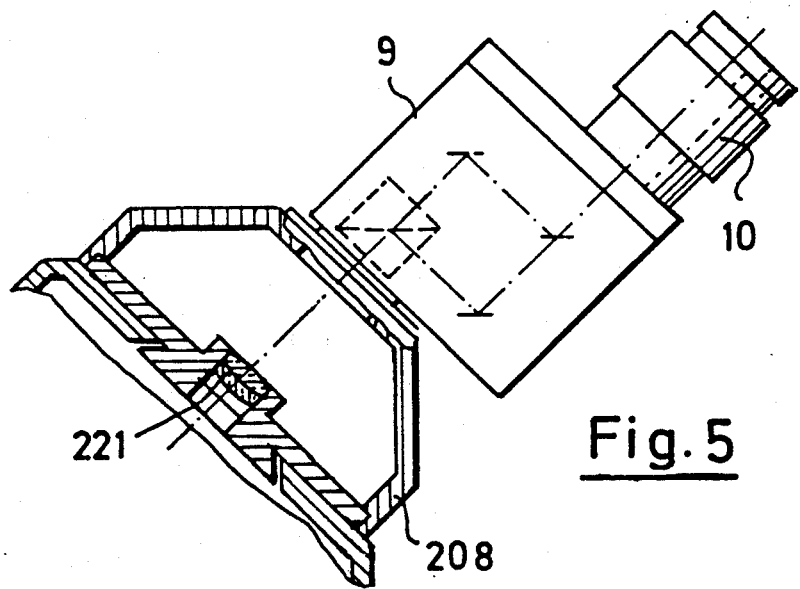
FIG. 5 is a sectional view of a second alternative embodiment for the interchangeable tube of FIG. 1.
Figure 6:
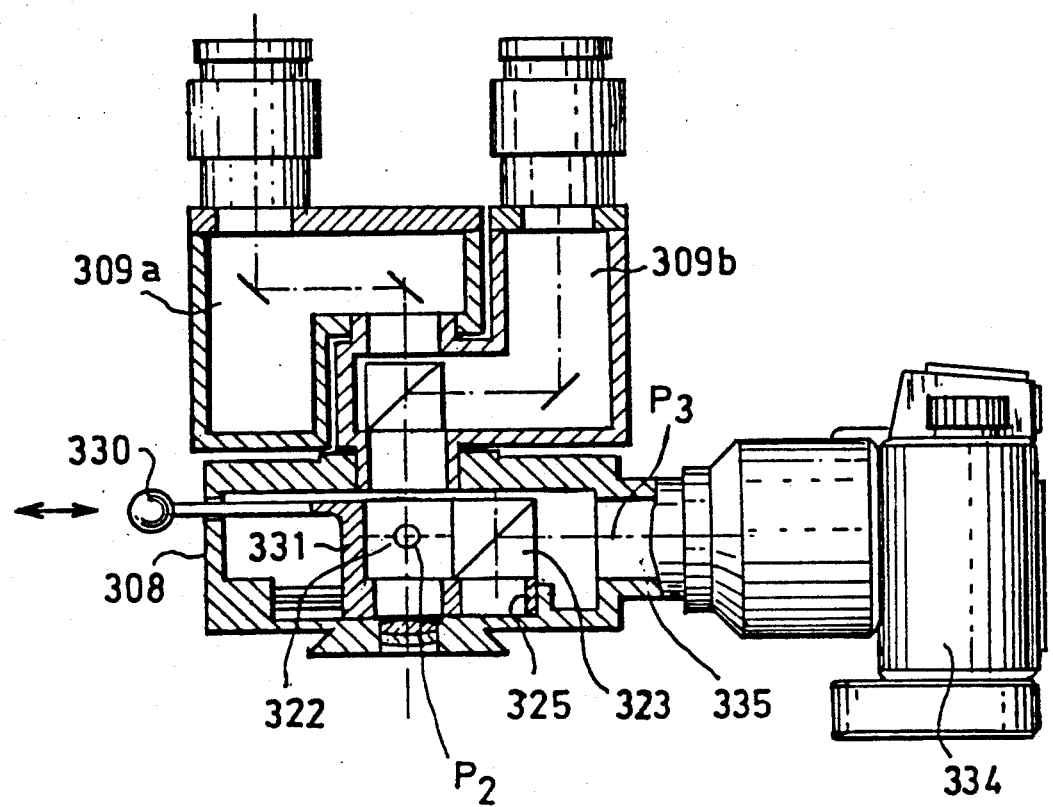
FIGS. 6 and 7 illustrate a third alternative embodiment for the interchangeable tube of FIG. 1, this embodiment being shown in FIG. 6 in a sectional view taken perpendicular to that shown in FIG. 1, the view of FIG. 7 being similar to that shown in FIG. 1.

Another feature of the invention relates to the versatility provided by removable/interchangeable tube 8, the design of which can be varied as indicated by the different embodiments illustrated in FIGS. 4, 5, and 6. In the variation shown in FIG. 4, the interchangeable tube 108 deflects a portion of the light to vertical path of rays $P_2$ by using relatively simple optics similar to the arrangement illustrated in FIG. 3 and just referred to above. Namely, in this embodiment, the deflected ray path is not reflected twice within a single prism. Instead, a portion of the light travelling through a tube lens 121 is partially reflected by surface 45 of a beam-splitting prism 122 and, thereafter, is reflected into the vertical by a separate mirror 123.

In an even simpler and less expensive arrangement shown in FIG. 5, the additional auxiliary image port and vertical path for deflected light are omitted. Again, interchangeable tube 208 can be used in place of tube 8 (FIG. 1), but it contains no other optical elements other than its respective tube lens 221. However, to compensate for the effective lengthening of the path of rays between lens 221 and the intermediate image plane in eyepiece 10 due to the omission of the glass prism, the position of tube lens 221 is adjusted (as compared with tube lenses 21 and 121 in interchangeable tubes 8 and 108), being shifted toward eyepiece 10. As indicated above, by providing each respective interchangeable tube unit with its own respective tube lens, the distances between the tube lenses and their respective image planes can be carefully controlled during the manufacture of the unit. By virtue of this important design feature, the tolerances required for the dovetail connections between each respective unit and housing 1 become less critical than would otherwise be required if tube lens 21 (FIG. 1) were incorporated in housing 1 and the image planes in the interchangeable units would have to be accurately correlated to the position of lens 21.

Figure 7:
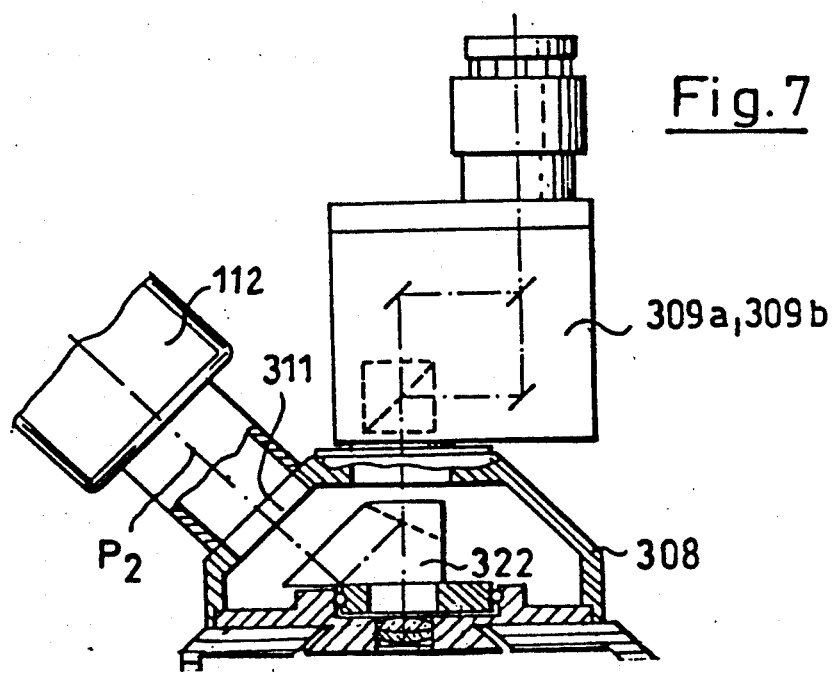

FIGS. 6 and 7 illustrate a much more complex interchangeable tube 308 which includes, in addition to a pair of tube arms 309a and 309b of a binocular tube, two auxiliary image ports positioned along respective vertical and horizontal ray paths. FIG. 7 shows a vertical cross section of tube 308 which corresponds to the cross section of tube 8 shown in FIG. 1 and similarly includes a vertical ray path $P_2$ along which is positioned auxiliary image port 311 and an accessory in the form of video recorder 112, which correspond, respectively, to port 11 and recorder 12 of interchangeable tube 8 shown in FIG. 1. FIG. 6 is a different cross-sectional view of interchangeable tube 308 taken along a plane perpendicular to that shown in FIG. 1. Positioned along a horizontal ray path $P_3$ is another auxiliary image port 335 to which still another accessory, camera 334, is mounted.

Interchangeable tube 308 includes two beam-splitting prisms 322, 323 mounted on a sliding element 325 which can be adjusted from outside tube 308 by means of a handle 330 and an adjustment rod 331. The first adjustment position of sliding element 325 is shown in both FIGS. 6 and 7, namely, prism 322 is aligned viewing ray path B, allowing a portion of the light travelling along path B to pass straight through prism 322 into binocular tubes 309a, 309b, while deflecting another portion of the light into vertical path $P_2$. By adjusting the position of handle 330, prism 323 can be moved into alignment with ray path B. Again, a portion of the light travelling along path B is allowed to pass straight through prism 323 to the binoculars. However, the remaining portion of the light is deflected by prism 323 along horizontal path $P_3$ to camera 334.

Although the features of the invention relating to the removable/interchangeable tubes have been described as being applied to an inverted microscope, it is obvious that these features are applicable as well to upright microscopes in which the path of viewing rays extends diagonally upward toward the viewer.

We claim:
1. A microscope having a housing, a path of viewing rays extending diagonally upward in the direction of the viewer, and an interchangeable tube attached to the housing and aligned with said diagonally-upward path of viewing rays, said interchangeable tube comprising:
   an auxiliary image port located in said tube,
   a vertically-oriented auxiliary path of rays aligned with said auxiliary image port, beam-splitting means for deflecting a portion of the light travelling along said diagonally-upward viewing path to said auxiliary image port, and reflecting means including said beam-splitting means and another reflecting surface for directing said deflected portion of light along said auxiliary path of rays, light travelling along said diagonally-upward viewing path passing through said beam-splitting means in a straight line.

2. A microscope according to claim 1 wherein said interchangeable tube further comprises:

second beam-splitting means.

a movable element for supporting both said beam-splitting means, and a further auxiliary image port positioned along an additional horizontally-oriented auxiliary ray path, said movable element having at least two adjustment positions in one of which said second beam-splitting means is moved into said path of viewing rays to deflect a portion of the light travelling along said viewing ray path to said additional auxiliary ray path.

3. A microscope according to claim 1 wherein said microscope housing includes a further beam-splitting means for deflecting a portion of the light travelling along said diagonally-upward viewing path to a further auxiliary path of rays aligned with a further auxiliary image port located in said microscope housing, said further beam-splitting means being carried on a movable element having at least two adjustment positions in one of which said further beam-splitting means is moved out of said diagonally-upward path of viewing rays to allow all light to pass along said diagonally-upward path without deflection to said further auxiliary path of rays.

4. A microscope according to claim 3 wherein said further beam-splitting means comprises a prism having a splitting surface and a light-entry surface, and wherein all of the light passing along said viewing path passes through said light-entry surface, the portion of light deflected by said splitting surface being thereafter reflected at said light-entry surface by total internal reflection.

5. A microscope according to claim 4 wherein said prism consists of glass having an index of refraction of at least 1.55.

6. A microscope according to claim 1 wherein said path of viewing rays extends upward in the direction of the viewer at an angle of 45° relative to the vertical.

7. A microscope according to claim 1 wherein said interchangeable tube comprises a tube lens and a binocular viewing tube positioned on said first ray path.

8. In an inverted microscope for permitting a viewer to observe objects positioned on a specimen stage, said microscope including a housing having integrated therein a first ray path for directing light from a lens below said specimen stage to said viewer, said first ray path being deflected diagonally upward in the direction of said viewer, and a second ray path for light deflected form said first ray path, said second ray path leading to an auxiliary image port used for image recording and measurement purposes, the improvement comprising:

a reflector positioned below said lens for deflecting said first ray path in said diagonally-upward direction, a beam-splitting prism through which said first ray path travels in a straight line, said prism being positioned above said reflector in the diagonally-upward portion of said first ray path for deflecting light from said first ray path to said second ray path, a binocular tube in proximity to the upper end of the diagonally-upward portion of said first ray path for viewing rays, a third ray path, and a second optical element positioned along said first ray path ahead of said binocular tube for deflecting light from said first ray path to said third ray path.

9. The inverted microscope of claim 8 wherein said second optical element is a beam-splitting prism through which light passing along said first ray path in the direction of the viewer travels in a straight line.

10. The inverted microscope of claim 9 wherein light deflected by said beam-splitting prism is multiply-reflected, and wherein said third ray path is vertical.

* * * * *